United States Patent
Dähler et al.

(10) Patent No.: US 6,169,676 B1
(45) Date of Patent: *Jan. 2, 2001

(54) INVERTOR

(75) Inventors: Peter Dähler, Remigen; Osvin Gaupp, Baden; Gerhard Linhofer, Baden-Dättwil, all of (CH); Jean-François Ravot, Chevry (FR)

(73) Assignee: Asea Brown Boveri AG, Baden (CH)

( * ) Notice: Under 35 U.S.C. 154(b), the term of this patent shall be extended for 0 days.

This patent is subject to a terminal disclaimer.

(21) Appl. No.: 09/137,539

(22) Filed: Aug. 21, 1998

(30) Foreign Application Priority Data

Aug. 22, 1997 (DE) .............................. 197 36 612

(51) Int. Cl.⁷ .................................................. H02M 7/00
(52) U.S. Cl. .................. 363/71; 363/40; 363/43
(58) Field of Search ................... 363/40, 41, 43, 363/39, 71, 65, 82, 83; 361/42

(56) References Cited

U.S. PATENT DOCUMENTS

| 3,671,810 | 6/1972 | Barnes et al. ........................ 361/58 |
| 4,573,098 | * 2/1986 | Williston ............................... 361/42 |
| 5,065,303 | 11/1991 | Nguyen et al. ....................... 363/40 |
| 5,345,359 | 9/1994 | Konstanzer ......................... 361/152 |
| 5,508,905 | 4/1996 | Reichard .............................. 363/71 |
| 5,999,427 | * 12/1999 | Dahler et al. ........................ 363/71 |
| 5,999,428 | * 12/1999 | Dahler et al. ........................ 363/71 |

FOREIGN PATENT DOCUMENTS

| 633 918 | 12/1982 | (CH) . |
| 36 02 496 | 7/1987 | (DE) . |
| 0 034 845 | 9/1981 | (EP) . |

* cited by examiner

Primary Examiner—Jessica Han
(74) Attorney, Agent, or Firm—Oblon, Spivak, McClelland, Maier & Neustadt, P.C.

(57) ABSTRACT

An invertor having a plurality of invertor bridges which operate in parallel and whose output voltages are summed. The invertor bridges are driven with pulse duration modulation according to an auxiliary control voltage. The auxiliary control voltages of the individual invertor bridges have a constant phase difference between one another. The output voltages of the bridges are summed by a center tap which is grounded by a ground connection. Effective suppression of the common-mode current distortion is achieved by having the switch arranged in the ground connection.

28 Claims, 6 Drawing Sheets

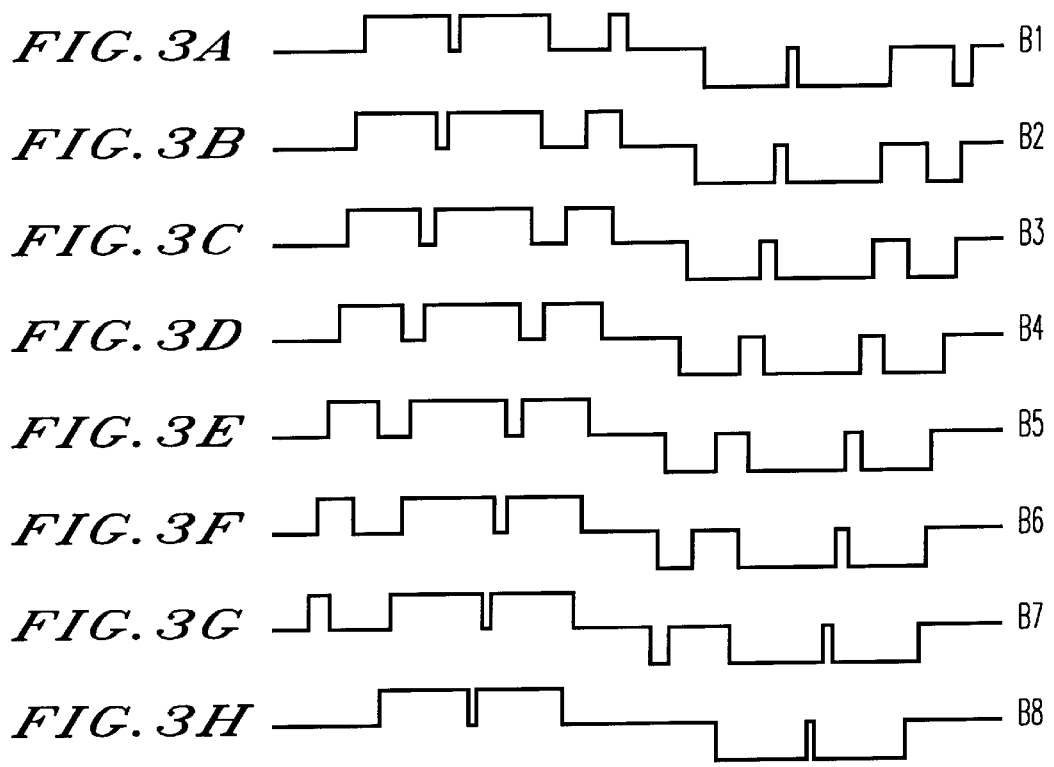
FIG. 3A — B1
FIG. 3B — B2
FIG. 3C — B3
FIG. 3D — B4
FIG. 3E — B5
FIG. 3F — B6
FIG. 3G — B7
FIG. 3H — B8
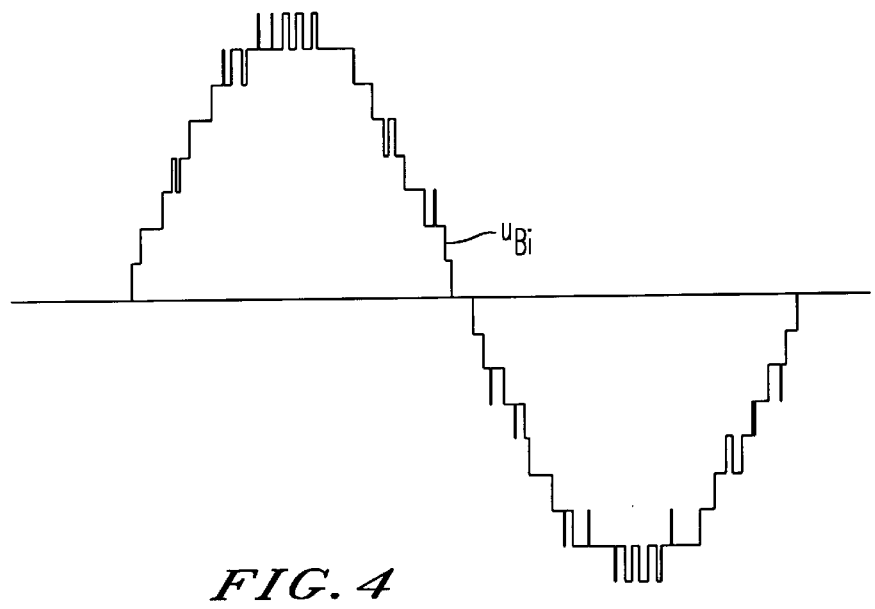
FIG. 4

INVERTOR

BACKGROUND OF THE INVENTION

1. Field of the Invention

The present invention is concerned with the field of power electronics. It relates to an invertor comprising a plurality of invertor bridges, which operate in parallel on the same DC voltage intermediate circuit and whose output voltages are summed via summation means, the invertor bridges each being driven with pulse duration modulation according to a carrier signal, and the carrier signals of the individual invertor bridges having a constant phase difference between one another, and the summation means having a center tap, which is grounded via a ground connection.

2. Discussion of Background

In order to connect electricity supply systems having a different number of phases and/or AC voltage frequency, such as e.g. between a 50 Hz three-phase power supply system and a single-phase 16 ⅔ Hz railway grid, use is increasingly being made of solid-state couplings and railway power converters which are equipped with power semiconductors and are often designed as converters having a DC voltage intermediate circuit. In accordance with FIG. 1, such a railway power converter 10 comprises, for example, a (thyristor-equipped) converter 13 which draws the three-phase current from the three-phase power supply system 11 via a transformer 12 and converts it into a direct current, a DC voltage intermediate circuit 14 for smoothing and/or buffer-storage, and an invertor 15 which converts the direct current back into an alternating current at the desired frequency and feeds it into the railway grid 16.

In the invertor 15, use is usually made of one or more invertor bridges, operating in parallel, with switchable valves (e.g. GTOs), which are driven with pulse duration modulation and approximate the desired sinusoidal output voltage by a sequence of duration-modulated square-wave pulses of alternating polarity. A triangular-waveform auxiliary control voltage is usually used in this case for the pulse duration modulation. Details about the driving can be found for example in an offprint (No. 9608-1000-0) from the applicant "Vollstatische 100-MW-Frequenzkupplung Bremen" [Solid-state 100 MW frequency coupling Bremen]. If a plurality of invertor bridges are operated in parallel, the output voltages are summed. A reduction in the harmonic content is achieved by driving the individual invertor bridges via the auxiliary control voltages in a phase-shifted manner.

An example of the structure of an invertor 15 is represented in FIG. 2. The invertor 15 of this example comprises 8 invertor bridges B1, ... ,B8 which operate in parallel and, with a respective capacitor C1, ... ,C8 in parallel at the input, are connected to the input lines 17, 18 coming from the DC voltage intermediate circuit 14. A transformer 19 is provided for the purpose of summing the output voltages of the invertor bridges B1, ... ,B8, which transformer contains a winding pair comprising a primary winding P1, ... ,P8 and a secondary winding S1, ... ,S8 for each of the invertor bridges B1, ..., B8. The outputs of the invertor bridges B1, ... ,B8 are respectively connected to the corresponding primary windings P1, ... ,P8; the secondary windings S1, ... ,S8 are connected in series. The summed output signal is available on the output lines 20, 21. In order to suppress harmonics, the transformer 19 may additionally be equipped with tertiary windings T1, ... ,T8, which are connected in series and are damped by a corresponding filter circuit 25 (in this respect see, for example, EP-B1-0 149 169). Examples of duration-modulated and phase-shifted pulse trains for the invertor bridges B1, ... ,B8 are represented in FIG. 3. Summation of the individual pulse trains in the transformer 19 produces therefrom the resultant summation voltage $u_{Bi}$ in FIG. 4.

Problems with the type of invertor illustrated in FIG. 2 arise if—as is necessary in the case of some railway grids—the transformer 19 of the invertor 15 is grounded at a center tap 23 by a ground connection 24 via a resistor 22 (or else without a resistor, that is to say in "hard" fashion) (see FIG. 2). These problems may be illustrated with reference to the equivalent circuit diagrams represented in FIGS. 5 to 8: The invertor, which operates as a voltage source converter (Voltage Source Converter, VSC), can be described in principle (FIG. 5) by a voltage source 26 having the voltage $u_{Bi}$ which drives a corresponding current $i_{Bi}$ through a circuit formed by the impedances 27, 28 and 29. The impedances 27 and 28 with the values $z_1$ and $Z_2$, respectively, represent the transformer 19, and the impedance 29 with the value $Z_3$ represents the filter circuit 25. The railway grid 16 can be described in the equivalent circuit diagram by the impedance 30 ($Z_4$) and the voltage source 31.

As a result of the grounding (via the resistor 22) at the center tap 23 of the transformer 19, the equivalent circuit diagram of the VSC from FIG. 5 can be converted into an equivalent circuit diagram in accordance with FIG. 6. The voltage source 26 is in this case divided into two voltage sources 32 and 33 having the partial voltages $u_{Bi,a}$ and $u_{Bi,b}$, where:

$$u_{Bi}=u_{Bi,a}-u_{Bi,b} \qquad (1)$$

The impedances 27 and 28 of the transformer 19 are now divided in FIG. 6 into impedances 34 and 39 and, respectively, 35 and 40, in each case having half the original impedance value, namely $z_1/2$ and $z_2/2$. The impedance 29 with the value Z3 is preserved while the impedance 30 and the voltage source 31 of the railway grid 16 are likewise divided into the impedances 36 and 41 (in each case having the value $Z_4/2$) and, respectively, voltages sources 42 and 43. The grounding via the center tap 23 of the transformer 19 is represented by the resistor 37 having the value $R_E$ in FIG. 6. A corresponding resistor 38 having the value $R_{E,r}$ describes the total remote grounding resistance of the railway grid 16.

According to the concept of modal decomposition, the equivalent circuit diagram of FIG. 6 can be decomposed into two superposed subsystems, namely into the common-mode system and the differential-mode system. The two superposed systems can then be treated separately from one another and the resultant currents and voltages simply added at the end of the analysis in order to obtain the real physical quantities. The equivalent circuit diagram in the common-mode system for the upper half of the VSC is represented in FIG. 7. In addition to the already known impedances 34, 35 and 36, the circuit contains the resistors 45 and 46, which each amount to twice the grounding resistors 37 and 38, respectively. The voltage source 44 outputs a voltage $u_{BI,CM}$ which drives a current $i_{Bi,CM}$ through the circuit. The equivalent circuit diagram in the differential-mode system for the upper half of the VSC is illustrated in FIG. 8. In addition to the already known impedances 34, 35 and 36, the impedance 48 is present here as well, which impedance corresponds to half the impedance 29 and is characteristic of the filter circuit 25. The voltage source 47 outputs a voltage $u_{Bi,D}$ which drives a current $i_{Bi,D}$ through the circuit.

The following relationship emerges for the voltages and currents:

$$u_{Bi,a} = u_{Bi,CM} + u_{Bi,D} \tag{2}$$

$$u_{Bi,b} = u_{Bi,CM} - u_{Bi,D}, \text{ and also} \tag{3}$$

$$i_{Bi} = i_{Bi,CM} + i_{Bi,D} \text{ and} \tag{4}$$

$$i_E = 2 * i_{Bi,CM}. \tag{5}$$

is immediately evident from FIGS. 5 to 8 and equations (1) to (5) that the common-mode voltage $u_{Bi,CM}$ is undesirable because it drives a common-mode current $i_{Bi,CM}$ which can flow back only through the grounding resistors 37 and 38. The level of the common-mode current $i_{Bi,CM}$ is primarily limited by the impedances $z_1$ and $z_2$ of the transformer 19. The common-mode current $i_{Bi,CM}$ has two disadvantageous effects:

It causes considerable losses both in the local grounding resistor 22 or 37 and in the remote grounding resistor 38. As shown by simulations of a real plant (approximately 50 MW), the losses in the grounding resistor 22 (at a nominal resistance of $R_E=334\ \Omega$) can be approximately 50 kW and are therefore of an unacceptable order of magnitude.

In the railway grid (for example a 138 kV grid), it can cause interference in adjacent communications equipment.

SUMMARY OF THE INVENTION

Accordingly, one object of the invention is to provide a novel VSC invertor in which the currents flowing via the ground connection are suppressed or attenuated to a harmless value.

In the case of an invertor of the type mentioned in the introduction, the object is achieved by virtue of the fact that, in order to attenuate or suppress in-phase interference currents flowing via the ground connection and the interference voltages associated with said interference currents, switching means are arranged in the ground connection. The arrangement of the switching means directly in the ground connection makes it possible to prevent in-phase interference currents from flowing via the ground connection in the normal case (when the switching means are open). In the event of a short circuit, the switching means can be closed, with the result that the short-circuit currents can flow away to ground.

A first preferred embodiment of the invention is distinguished by the fact that the switching means comprise an inductor designed as a saturable reactor. Given a suitable rating, the inductor constitutes a high impedance for the common-mode currents, without the resistive connection of the center tap to ground being impaired in the event of a fault. At the same time, the inductor, as a passive component, is simple and reliable in its functioning.

In the normal operating case, a simple inductor satisfies the requirements made of it without any problems. However, problems would arise in the event of a short circuit in the railway grid because then the high impedance of the inductor would prevent the steeply rising short-circuit current from flowing away to ground and would thus endanger other parts of the plant. The cancelling of the attenuation function in the event of a short circuit is achieved by the fact that the inductor is designed as a saturable reactor whose voltage-time integral is matched to the expected voltage-time integral of the interference voltages and interference currents during normal operation. In the normal case, the saturable reactor operates below saturation and attenuates the currents flowing in the ground connection. In the event of a short circuit, the saturable reactor attains saturation and then allows the short-circuit current to pass largely unhindered.

Another preferred embodiment is distinguished by the fact that the switching means comprise a thyristor switch. During normal operation, the thyristor switch is open and thus reliably prevents the abovementioned interference currents from being able to flow via the ground connection. In the event of a short circuit, the thyristor switch, which comprises two reverse-connected parallel thyristors, for example, is closed and the short-circuit currents can flow unhindered via the ground connection.

Further embodiments emerge from the dependent claims.

An invertor according to the invention is preferably used in a converter having a DC voltage intermediate circuit, in particular in a railway power converter or a frequency coupling.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows examples of pulse duration-modulated output pulse trains of the individual invertor bridges from FIG. 2;

FIG. 4 shows the summation voltage resulting from summation of the output pulse trains from FIG. 3;

DESCRIPTION OF THE PREFERRED EMBODIMENTS

Figure 1:
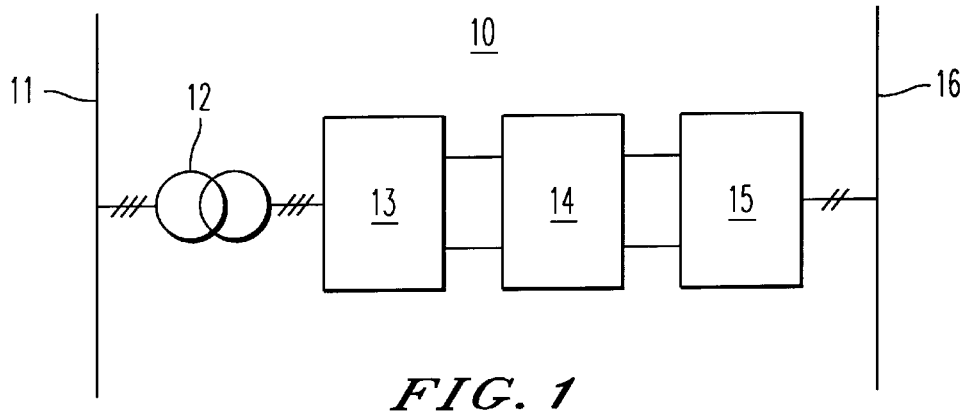
FIG. 1 shows the fundamental structure of a railway power converter.
Figure 2:
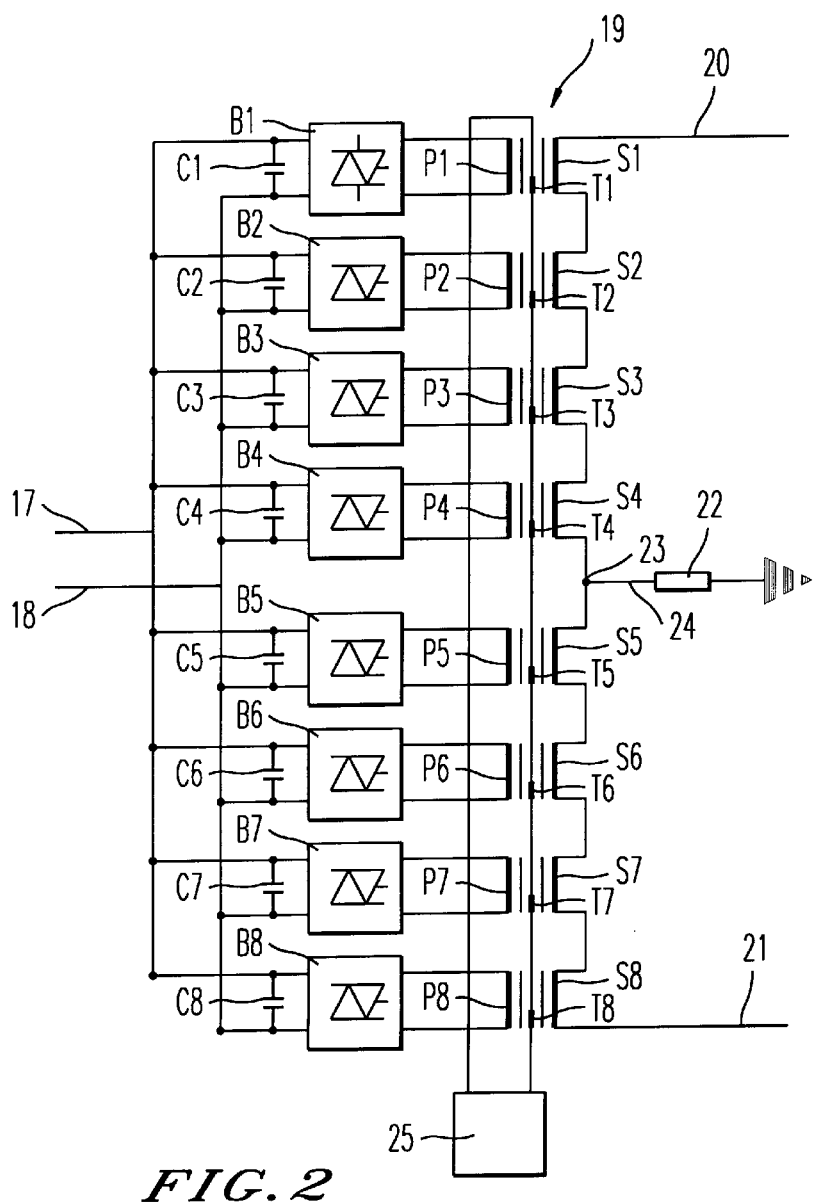
FIG. 2 shows the block diagram of an invertor, suitable for the railway power converter according to FIG. 1, with a plurality of invertor bridges in parallel and with center-point grounding of the transformer.
Figure 5:
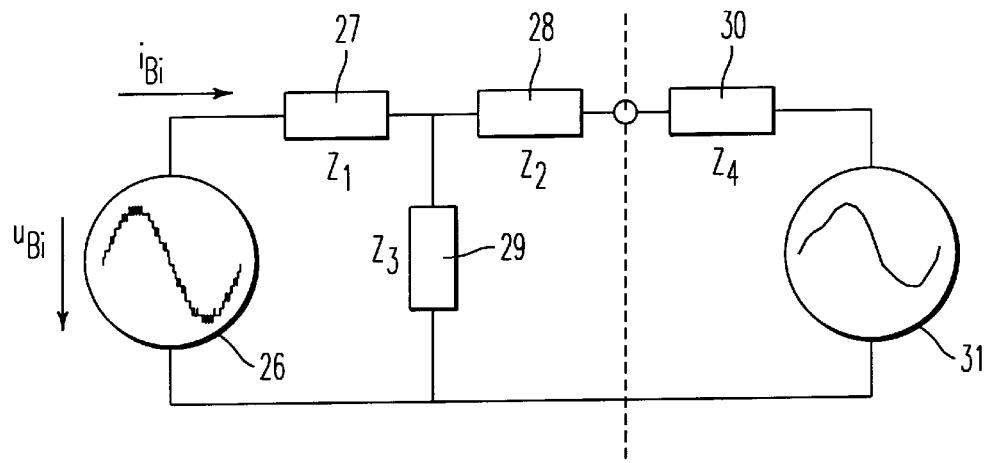
FIG. 5 shows the equivalent circuit diagram of the invertor (connected to the railway grid) from FIG. 4 without center-point grounding of the transformer.
Figure 6:
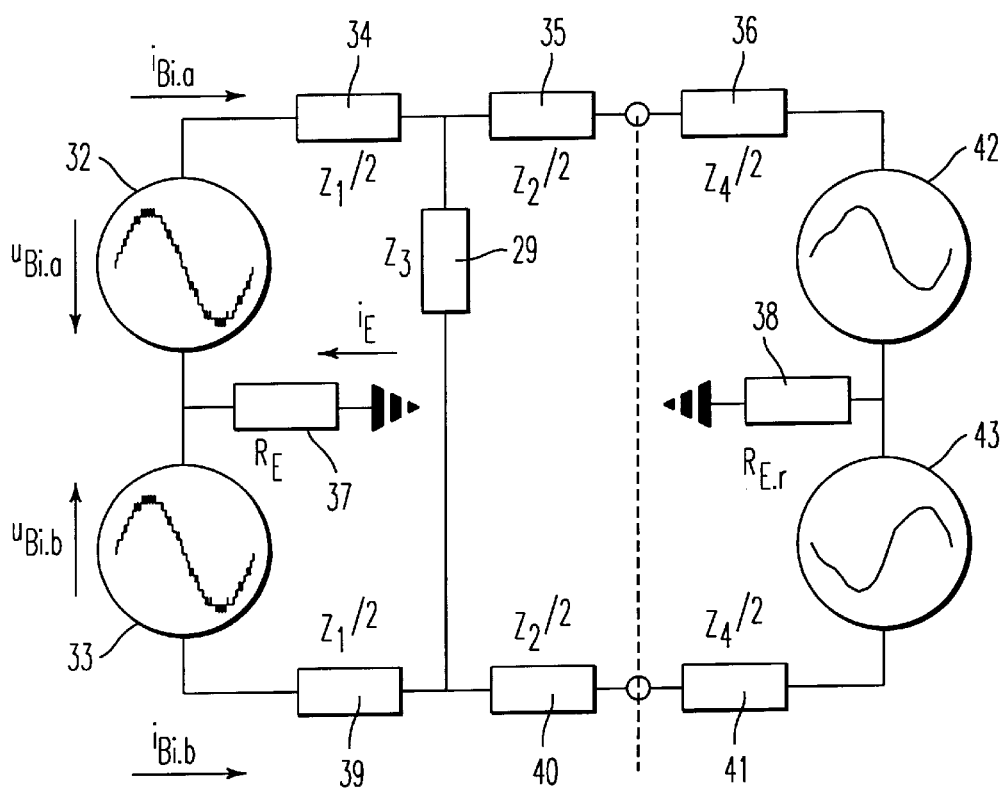
FIG. 6 shows the equivalent circuit diagram corresponding to FIG. 5 with center-point grounding.
Figure 7:
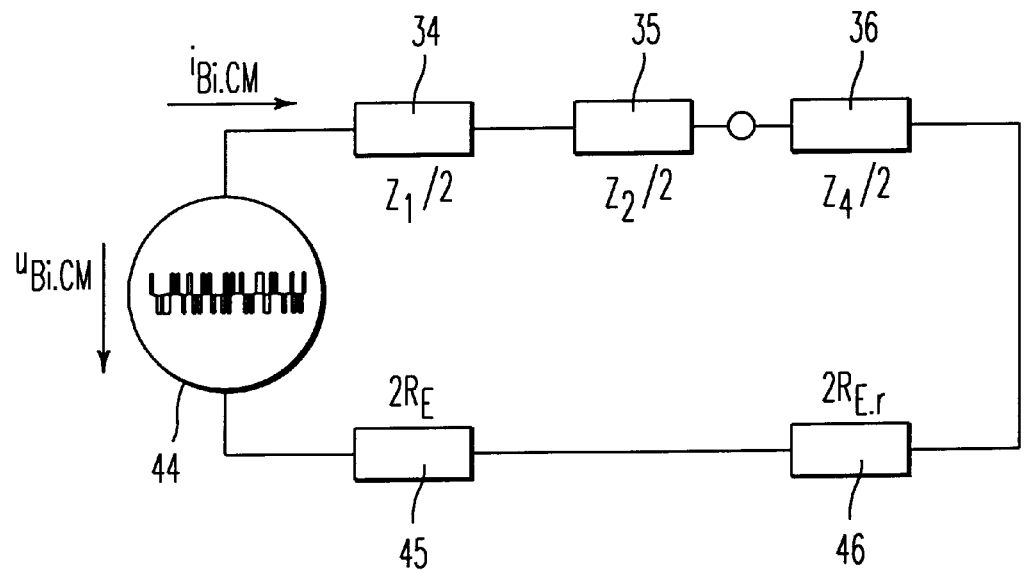
FIG. 7 shows the equivalent circuit diagram for the common-mode subsystem derived from the equivalent circuit diagram of FIG. 6.
Figure 8:
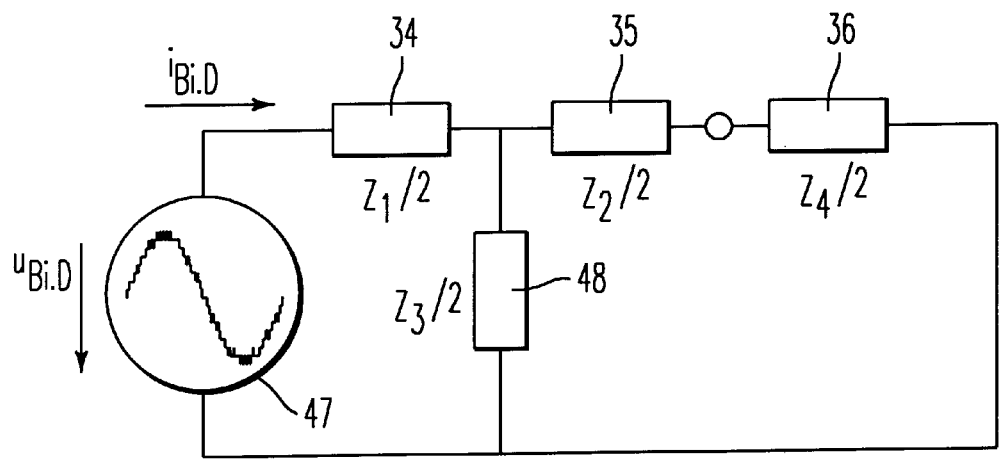
FIG. 8 shows the equivalent circuit diagram for the differential-mode subsystem derived from the equivalent circuit diagram of FIG. 6.
Figure 9:
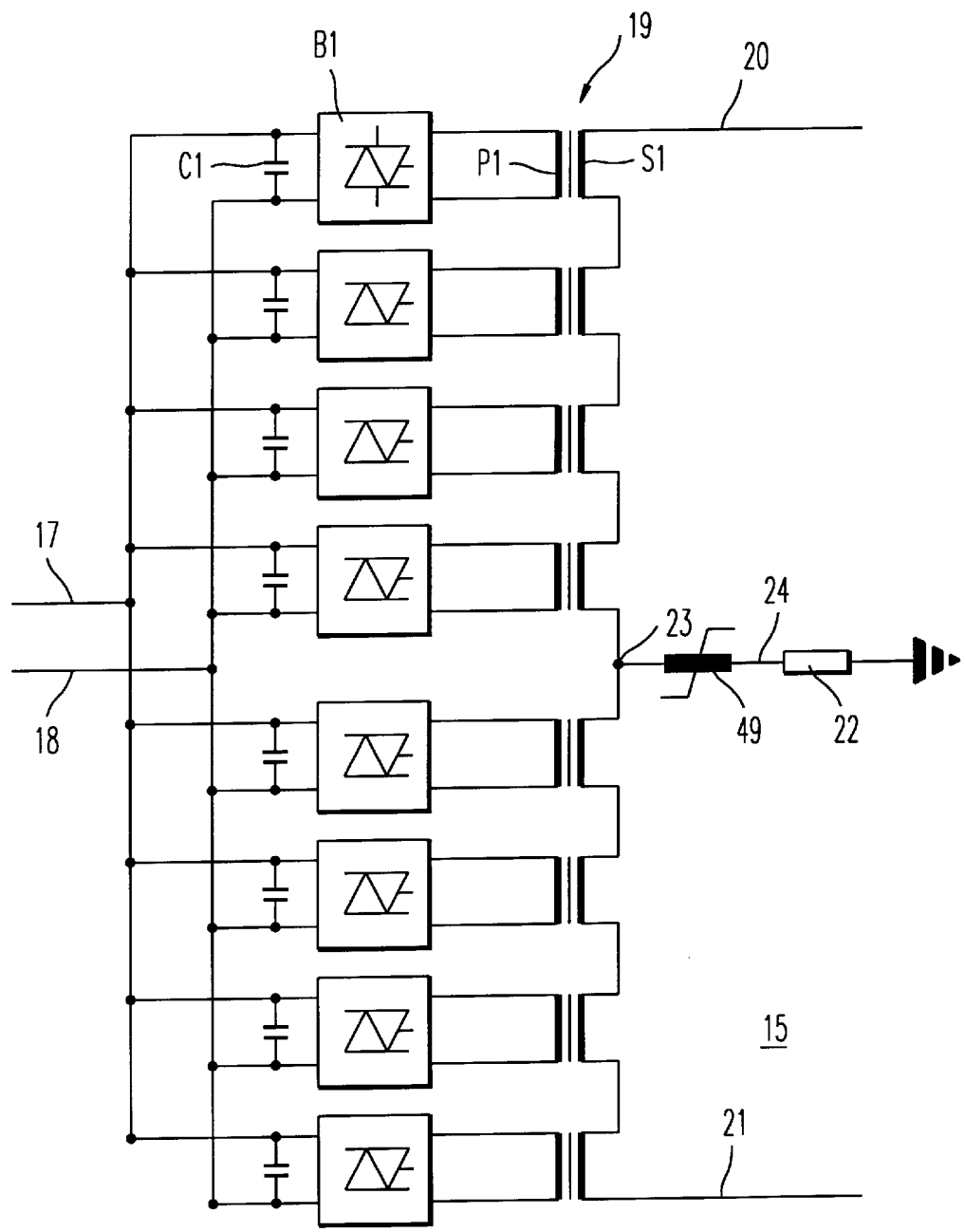
FIG. 9 shows a first preferred exemplary embodiment of an invertor according to the invention with a saturable reactor for suppressing the common-mode currents flowing in the ground line.

Referring now to the drawings, wherein like reference numerals designate identical or corresponding parts throughout the several views, FIG. 9 represents a preferred exemplary embodiment of an invertor according to the invention. The invertor of FIG. 9 is essentially similar in its structure to the invertor of FIG. 2. The tertiary windings on the transformer 19 and the associated filter circuit 25 have been omitted here, for the sake of simplicity. The ground connection 24, which leads from the center tap 23 of the transformer to ground via a resistor 22, is provided with a saturable reactor 49 connected in series with the resistor 22 for the purpose of attenuating or suppressing the common-mode currents in the ground connection. The characteristic of the saturable reactor 49 is rated such that in the normal (steady-state) operating case of the invertor 15, the expected in-phase currents, which may be relatively high given the small number of 8 invertor bridges B1, . . . ,B8, are greatly attenuated whereas, in the event of a short circuit, the saturable reactor 49 is driven to saturation and allows the short-circuit current to pass largely unhindered. To that end, the voltage-time integral of the saturable reactor is matched to the expected voltage-time integral of the interference voltages during normal operation.

Figure 10:
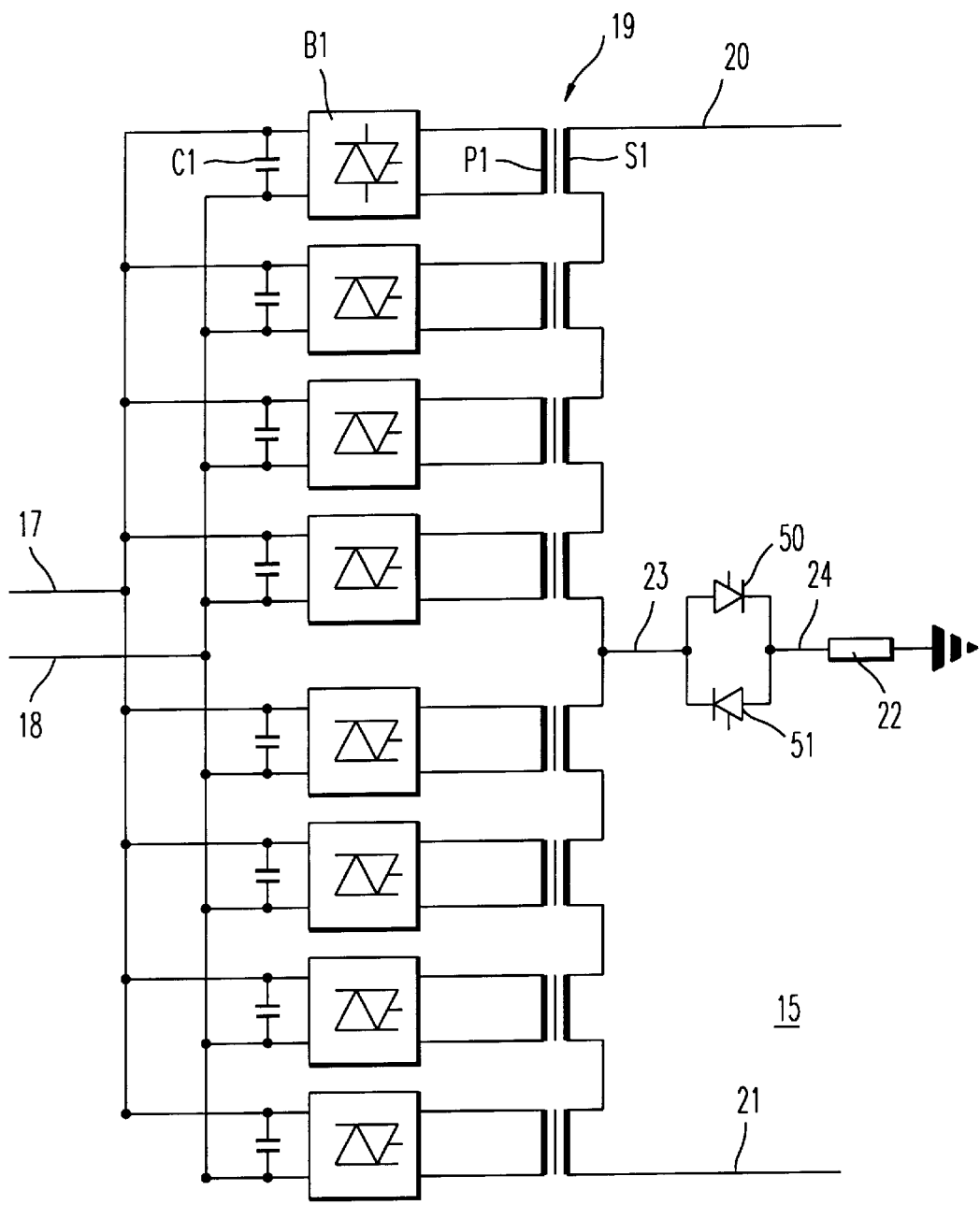
FIG. 10 shows a second preferred exemplary embodiment of an invertor according to the invention with a thyristor switch for suppressing the common-mode currents flowing in the ground line.

As already mentioned further above, according to FIG. 10, the switching means used may also be, instead of the saturable reactor 49, a thyristor switch which is formed from two reverse-connected parallel thyristors 50, 51, for example, and is open in the normal case and is activated in the event of a short circuit.

Furthermore, it is conceivable for the saturable reactor 49 also to be used in an invertor which is grounded in "hard" fashion at the center tap of the transformer, that is to say does not have a specific grounding resistor 22.

EXAMPLE

Given a transmitted rated power of approximately 55 MVa and a number of 8 invertor bridges, without any attenuation measures there is a common-mode current distortion (common-mode currents) which makes up about 3% of the rated current (of approximately 400 A). A maximum power loss of 100 kW is then dissipated across a grounding resistor 22 or 37 of $R_E=240\ \Omega$. By inserting a saturable reactor 49 having an unsaturated inductance of $\geq 2H$ into the ground connection 24, it is possible to reduce the current distortion and thus the power loss dissipated across the grounding resistor to <5 kW.

The invention has been explained in connection with a 1-phase transformer in FIGS. 9, 10. However, it goes without saying that it can be applied correspondingly to a 3-phase transformer.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An invertor comprising:
  a plurality of invertor bridges, which operate in parallel on a same DC voltage intermediate circuit;
  summer means for summing output voltages of the invertor bridges, and having a center tap, which can be grounded via a ground connection;
  the invertor bridges each being driven with pulse duration modulation according to an auxiliary control voltage, and auxiliary control voltages of the individual invertor bridges having a constant phase difference between one another; and
  switching means arranged in the ground connection in order to attenuate or suppress in-phase interference currents flowing via the ground connection and interference voltages associated with said interference currents.

2. The invertor as claimed in claim 1, wherein the switching means comprises an inductor designed as a saturable reactor.

3. The invertor as claimed in claim 2, wherein the voltage-time integral of the inductor is matched to the expected voltage-time integral of the interference voltages and interference currents during normal operation.

4. The inventor as claimed in claim 3, wherein a resistor is arranged in the ground connection, and wherein the switching means in the ground connection are connected in series with the resistor.

5. The invertor as claimed in claim 3, wherein the summation means comprises a transformer, which has a number of primary windings and associated secondary windings which corresponds to the number of invertor bridges, wherein each invertor bridge is respectively connected on the output side to a primary winding, and wherein the secondary windings are connected in series for the purpose of summing the output voltages.

6. The use of an invertor as claimed in claim 3 in a converter having a DC voltage intermediate circuit.

7. The inventor as claimed in claim 2, wherein a resistor is arranged in the ground connection, and wherein the switching means in the ground connection are connected in series with the resistor.

8. The invertor as claimed in claim 2, wherein the summation means comprises a transformer, which has a number of primary windings and associated secondary windings which corresponds to the number of invertor bridges, wherein each invertor bridge is respectively connected on the output side to a primary winding, and wherein the secondary windings are connected in series for the purpose of summing the output voltages.

9. The use of an invertor as claimed in claim 2 in a converter having a DC voltage intermediate circuit.

10. The invertor as claimed in claim 1, wherein the switching means comprises a thyristor switch.

11. The invertor as claimed in claim 10, wherein a resistor is arranged in the ground connection, and wherein the switching means in the ground connection are connected in series with the resistor.

12. The invertor as claimed in claim 10, wherein the summation means comprises a transformer, which has a number of primary windings and associated secondary windings which corresponds to the number of invertor bridges, wherein each invertor bridge is respectively connected on the output side to a primary winding, and wherein the secondary windings are connected in series for the purpose of summing the output voltages.

13. The use of an invertor as claimed in claim 10 in a converter having a DC voltage intermediate circuit.

14. The invertor as claimed in claim 1, wherein a resistor is arranged in the ground connection, and wherein the switching means in the ground connection is connected in series with the resistor.

15. The invertor as claimed in claim 14, wherein the summation means comprises a transformer, which has a number of primary windings and associated secondary windings which corresponds to the number of invertor bridges, wherein each invertor bridge is respectively connected on the output side to a primary winding, and wherein the secondary windings are connected in series for the purpose of summing the output voltages.

16. The use of an invertor as claimed in claim 14 in a converter having a DC voltage intermediate circuit.

17. The invertor as claimed in claim 1, wherein the summation means comprises a transformer, which has a number of primary windings and associated secondary windings which corresponds to the number of invertor bridges, wherein each invertor bridge is respectively connected on the output side to a primary winding, and wherein the secondary windings are connected in series for the purpose of summing the output voltages.

18. The invertor as claimed in claim 17, wherein 2n (n=1,2,3, . . . ) invertor bridges and primary windings and secondary windings are provided, and wherein the center tap is arranged between the n-th and the (n+1)-th secondary winding.

19. The use of an invertor as claimed in claim 17 in a converter having a DC voltage intermediate circuit.

20. The use of an invertor as claimed in claim 1 in a converter having a DC voltage intermediate circuit.

21. An inverter comprising:
   a plurality of invertor bridges operating in parallel on a same DC voltage intermediate circuit;
   a summer configured to sum output voltages of the plurality of invertor bridges, and having a center tap which can be grounded via a ground connection;
   said invertor bridges each being driven with pulse duration modulation according to an auxiliary control voltage, and auxiliary control voltages of the individual invertor bridges having a constant phase difference between one another; and
   a switching mechanism configured to attenuate or suppress in-phase interference currents flowing via the ground connection and interference voltages associated with said interference currents.

22. The inverter as claimed in claim 21, wherein the switching mechanism comprises an inductor designed as a saturable reactor.

23. The inverter as claimed in claim 22, wherein a voltage-time integral of the inductor is matched to an expected voltage-time integral of the interference voltages and interference currents during normal operation.

24. The invertor as claimed in claim 21, wherein the switching mechanism comprises a thyristor switch.

25. The inverter as claimed in claim 21, wherein a resistor is arranged in the ground connection, and is connected in series with the switching mechanism.

26. The inverter as claimed in claim 21, wherein the summer comprises a transformer, which has a number of primary windings and associated secondary windings corresponding to the number of inverter bridges,
   wherein each inverter bridge is respectively connected on an output side to a primary winding, and
   wherein the secondary windings are connected in series so as to sum the output voltages.

27. The invertor as claimed in claim 26, further comprising:
   2n (n=1, 2, 3, . . . ) inverter bridges and primary windings and secondary windings,
   wherein the center tap is arranged between the n-th and the (n+1)-th secondary winding.

28. The use of an invertor as claimed in claim 21 in a converter having a DC voltage intermediate circuit.

* * * * *